US005284224A

United States Patent [19]

Carruth et al.

[11] Patent Number: 5,284,224

[45] Date of Patent: Feb. 8, 1994

[54] LOW CLEARANCE VEHICLE LIFT

[75] Inventors: Wybert L. Carruth, Temple, Tex.; Edgar B. Provine, III, Millington, Tenn.

[73] Assignee: Delaware Capital Formation, Inc., Wilmington, Del.

[21] Appl. No.: 48,230

[22] Filed: Apr. 19, 1993

[51] Int. Cl.[5] .............................................. B60S 13/00

[52] U.S. Cl. ................................ 187/8.41; 254/89 H; 254/93 R

[58] Field of Search .................... 187/8.41, 8.59, 8.74, 187/8.67.9 R; 254/89 H, 2 B, 2 R, 89 R, 93 R, 93 H

[56] References Cited

U.S. PATENT DOCUMENTS

| | | | |
|---|---|---|---|
| 2,099,636 | 11/1937 | Weaver | 254/93 |
| 2,545,403 | 3/1951 | Wrenn | 254/2 |
| 2,891,765 | 6/1959 | Pearne | 254/2 |
| 3,414,086 | 12/1968 | Ulinski | 187/9 |
| 4,031,982 | 6/1977 | Lindfors | 187/9 R |
| 4,328,951 | 5/1982 | Laupper | 254/89 |
| 4,449,614 | 5/1984 | Matsuda | 187/9 R |
| 4,505,455 | 3/1985 | Beatty | 254/89 |
| 4,545,462 | 10/1985 | Sul | 187/8.41 |
| 4,763,761 | 8/1988 | McKinsey et al. | 187/8.41 |
| 5,009,287 | 4/1991 | Starr | 187/8.41 |

OTHER PUBLICATIONS

Gilbarco, *Free Floor Asymmetric Lift GFF-70* (4 page brochure plus 2 page parts diagram).

Grand, Inc., *Grand Lifts Twin Post* (4 page brochure).
VBM Corp., *Challenger2Plus* (4 page brochure).
Weaver Corp., *The Two Poster 90* (2 page brochure).
Western Mfg. Co. *The Chiefs Lifts* (4 page brochure).
Werther Int'l. *Werther 252* (4 page brochure).
Paul Lange & Co., *Hebebuhnen Lifts* (6 page brochure).
Hoffmann Werkstatt-Technik GmbH, *Hoffmann Duolift 2500* (8 page brochure).
Stertil-Koni, *Success in Motion* (4 page brochure).
J. A. Becker & Söhne, *JAB TwinLift* (8 page brochure).

*Primary Examiner*—D. Glenn Dayoan
*Assistant Examiner*—Kenneth Noland
*Attorney, Agent, or Firm*—Walker, McKenzie & Walker

[57] ABSTRACT

A dual-column vehicle lift having first and second lift columns, each with carriages slidably mounted thereon, and each with piggy-backed hydraulic lift cylinders. The piston rods of each column's piggy-backed lift cylinders extend in opposite directions, one attached to the carriage and the other attached to the base of the lift column. The piggy-backed construction allows a lower collapsed height of the cylinders and also allows a lower lift column height for a given lifting height, thereby allowing use within an area with reduced ceiling clearance. An interconnection tube equalizes hydraulic pressure between the piggy-backed lift cylinders, causing the two cylinders to extend their rods at the same rate. Equalizing cables are provided for ensuring that the carriages on the two lift columns rise and fall together.

10 Claims, 4 Drawing Sheets

LOW CLEARANCE VEHICLE LIFT

BACKGROUND OF THE INVENTION

1. Field of the Invention

The present invention relates, in general, to vehicle lifts having vertical columns in which lift arms are supported in cantilever fashion therefrom for supporting vehicles such as cars, trucks, and the like, in service stations, repair centers, and the like, and in particular, to low clearance vehicle lifts having such vertical columns and cantilevered lift arms.

2. Description of the related art

Dual-column hydraulic lifts are often used to raise and lower vehicles such as cars, trucks, and the like, in service stations, repair centers, etc. Typically, such dual-column lifts have a hydraulic cylinder within each lift column, with a chain or wire rope extending from the column base plate over a chain wheel or pulley atop the hydraulic cylinder and down to the carriage mounted on the lift column so that reciprocation of the pistons of each lift column's hydraulic cylinder causes the carriage to raise and lower. Such an arrangement is expensive to manufacture, requires periodic maintenance and lubrication, and also requires some sort of a slack cable or chain safety device to stop downward movement of the carriage when and if the cable or chain breaks.

Another known construction of dual-column lifts utilizes a telescoping (multi-section) hydraulic cylinder within each lift column to raise and lower the carriage mounted on each lift column. Telescoping hydraulic cylinders are known to be more expensive than non-telescoping, i.e., single section, hydraulic cylinders, and require some sort of speed control device so that the smaller section or stage does not raise and lower too quickly with respect to the other stages.

Additionally, dual-column lifts such as U.S. Pat. No. 5,009,287 are known that have a hydraulic cylinder within each lift column that directly raise and lower the carriage on each lift column without chains or cables. However, in such a i design, like the non-telescoping chain or cable-equalized lifts, the hydraulic cylinder, when collapsed or fully retracted, is approximately one-half the vertical lifting distance of the lift. Consequently, the piston rods of the hydraulic cylinders, when fully extended to raise a vehicle a given lifting height, rise to a substantial vertical distance from the floor, thereby preventing the use of such a dual-column lift in an area with low ceiling clearance.

SUMMARY OF THE INVENTION

The present invention is a dual-column vehicle lift in which each column includes "piggy-backed" hydraulic cylinders whose piston rods extend in opposite directions. One end of one piston rod is secured from movement with respect to the lift column, and one end of the other piston rod is attached to the lift carriage mounted on the lift column, for joint movement therewith. For a given lifting height, the "piggy-backed" hydraulic cylinders have a lower collapsed or lowered height than a single hydraulic cylinder would, thereby producing a shorter vertical height for the "piggy-backed" hydraulic cylinders at full extension.

It is an object of the present invention to provide a dual-column vehicle lift having, for a given lifting height, a lower full-extension height of the hydraulic cylinders than heretofore possible with single-stage hydraulic lift cylinders, thereby allowing use of the lift in areas with low ceiling clearance. It is a further object of the present invention to provide an improved dual-column vehicle lift without lift cables or chains as well as without the safety devices that would be needed with such lift cables or chains.

DESCRIPTION OF THE PREFERRED EMBODIMENT

Figure 1:
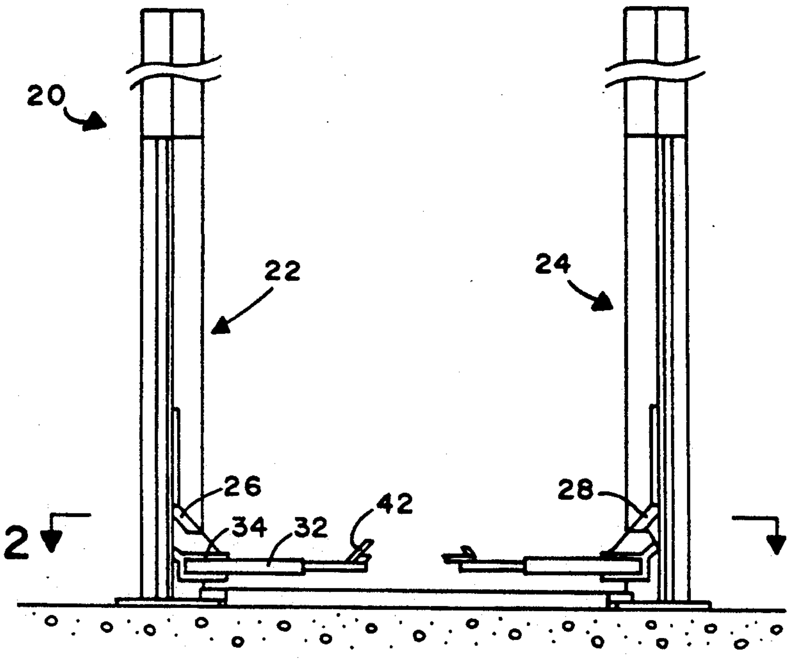
FIG. 1 is a front view of the present invention showing the two lift columns.
Figure 2:
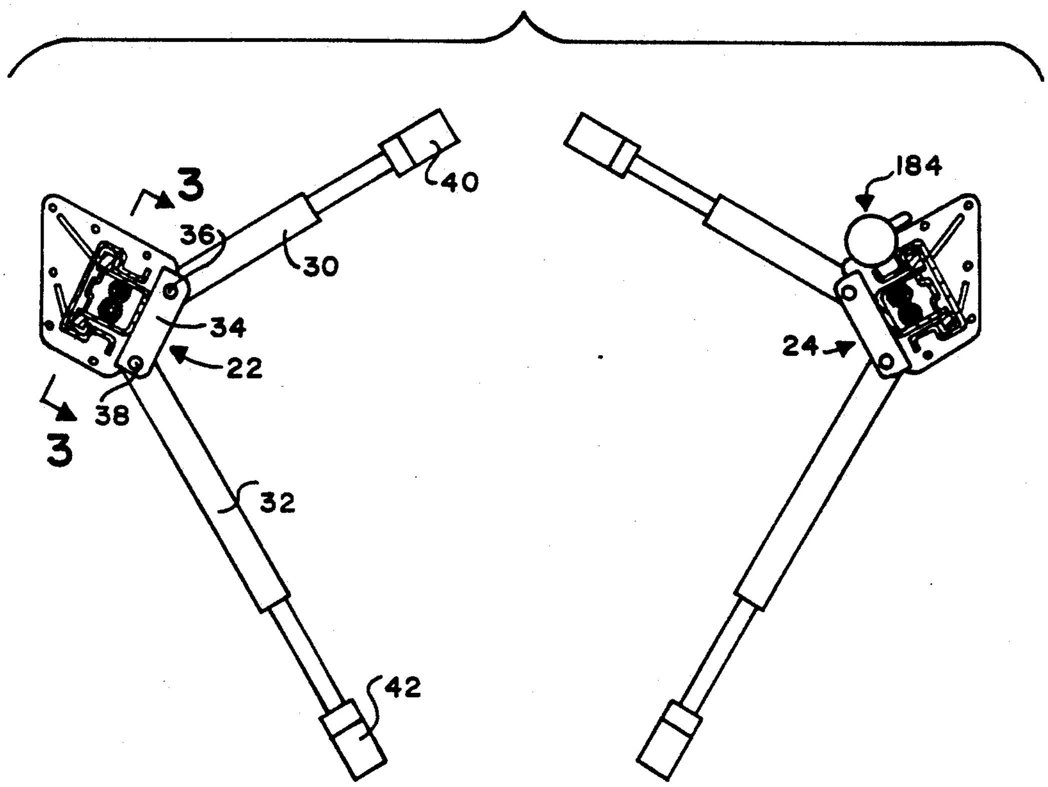
FIG. 2 is a top sectional view of the present invention, taken substantially along the line 2—2 shown in FIG. 1.

Referring to FIGS. 1-8, vehicle lift 20 is seen to comprise first and second lift columns 22 and 24, respectively, each having respective carriages 26 and 28 mounted thereon for vertical movement with respect thereto. Carriages 26 and 28 are slidably or rollingly mounted on and attached to lift columns 22 and 24, respectively, in a manner well-known to those skilled in the art, as, for instance, in a manner described in U.S. Pat. No. 5,009,287, issued Apr. 23, 1991, fully included by reference herein. The structure of first and second lift columns 22 and 24, as well as the structure of first and second carriages 26 and 28, shall be understood to be respectively similar, and the description hereinbelow of lift column 22 and carriage 26 shall be understood to be equally applicable to lift column 24 and carriage 28.

Carriage 26 has two cantilever arms 30 and 32 attached thereto for pivotal movement in a horizontal plane, as by yoke 34 having pins 36, 38 therethrough that pivotally secure arms 30 and 32 in a manner well-known to those skilled in the art. The ends of arms 30 and 32 preferably have well-known adjustable lift pads 40 and 42, respectively, for contacting the undercarriage of a vehicle, such as a truck, car, trailer, or the like, to be lifted by lift 20.

Carriage 26 preferably has laterally extending slide blocks 44, 46, 48, and 50 attached thereto, preferably as by welding or other ways well-known to those skilled in the art. As shown in FIGS. 3-6, blocks 44 and 46 are attached to the left side 51 (as viewed in FIGS. 3-4 and 6) of carriage 26 respectively at an upper portion 52 thereof and a lower portion 54 thereof, and blocks 48 and 50 are similarly attached to the right side 56 (as viewed in FIGS. 3-4 and 6) of carriage 26 respectively at an upper portion 58 thereof and a lower portion 60 thereof. Slide blocks 44 and 46 move upwardly and downwardly within a left channel 62 formed within lift column 22, and slide blocks 48 and 50 similarly move upwardly and downwardly within a right channel 64 formed within lift column 22. Preferably, blocks 44, 46, 48, and 50 each have a cap such as caps 66 and 68 shown in FIG. 5, preferably formed of ultra-high molecular weight polyethylene, that fit around the top, bottom, sides, and end of those blocks, for sliding contact with the interior faces of channels 62 and 64 for reducing the frictional force therebetween. It will be understood that rollers may be utilized to slidably mount carriage 26 within channels 62 and 64 without departing from the spirit and scope of the present invention, in a manner as will now be understood by those skilled in the art.

Figure 5:
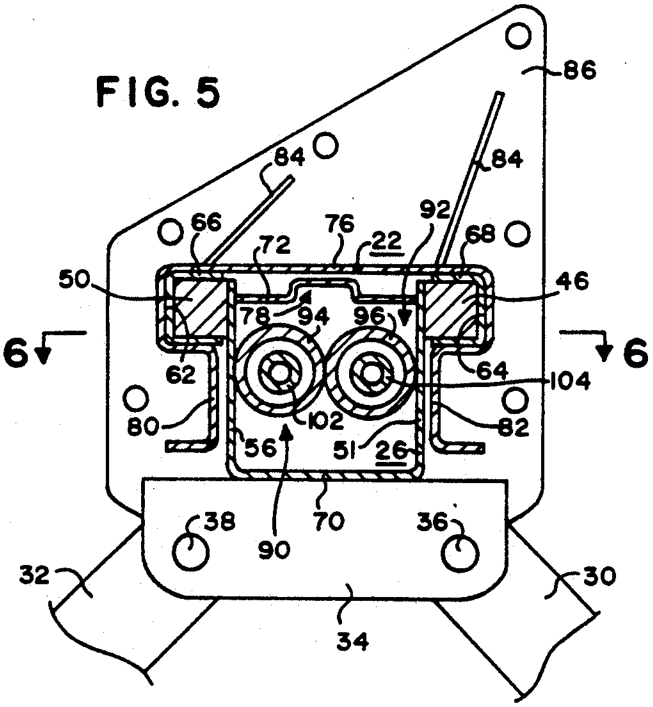
FIG. 5 is an enlarged top sectional view of the left lift column shown in FIG. 2.
Figure 6:
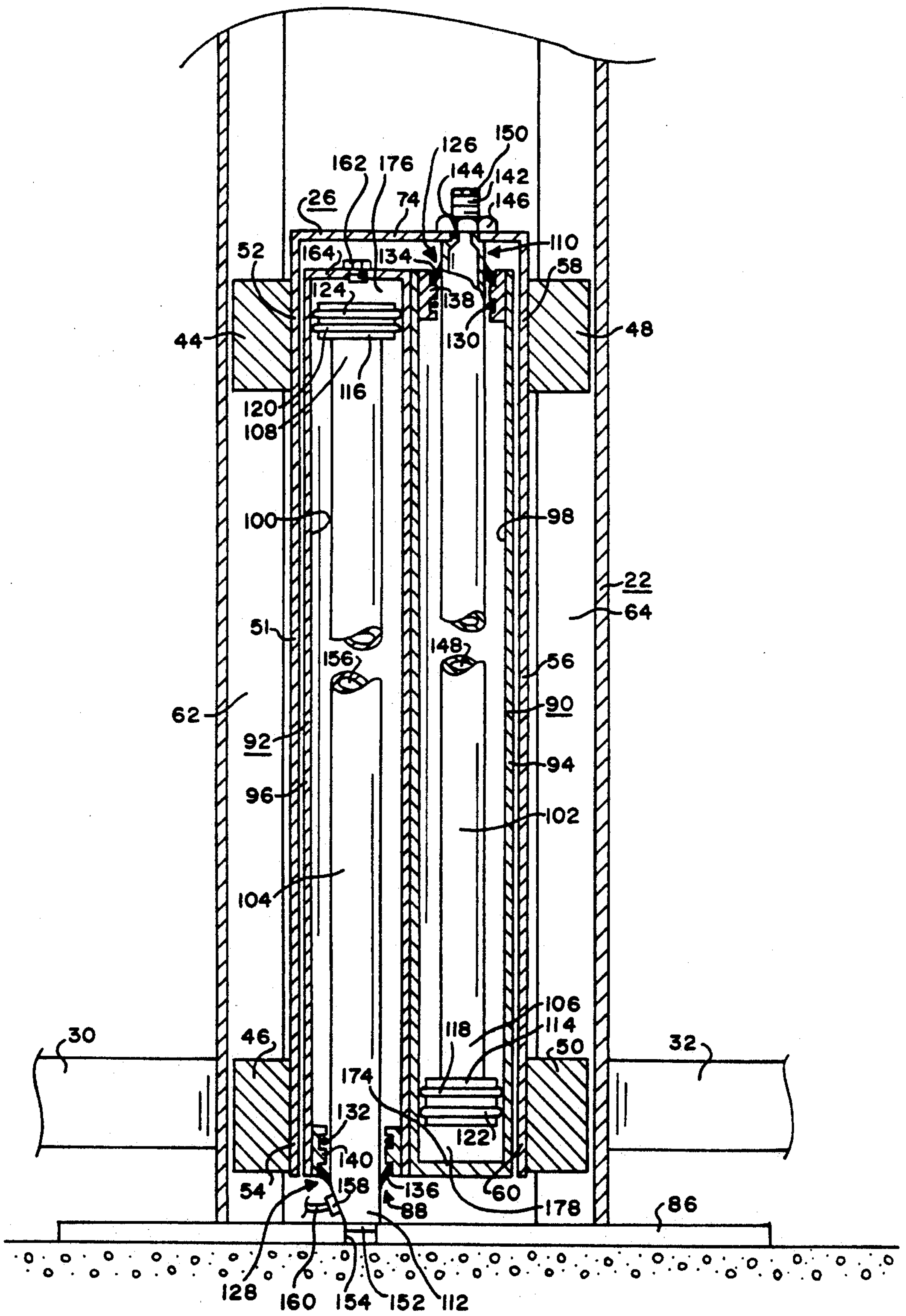
FIG. 6 is an enlarged sectional view of the same lift column shown in FIGS. 3-5, taken substantially along the line 6—6 shown in FIG. 5, with portions of the lift cylinders removed to show the internal details thereof.

Referring to FIGS. 5 and 6, carriage 26 preferably is constructed as a tubular box having four sides 51, 70, 56, and 72, consecutively, as well as a top 74. The bottom of the box is preferably left open for reasons that will soon become apparent. Rear side 72 of carriage 26, adjacent rear wall 76 of lift column 22, may have a bended portion 78 formed therein for structural rigidity as shown. Carriage 26 preferably rests within lift column 22 for vertical movement therewithin as shown in FIG. 5, enclosed on three sides by sidewalls 80 and 82, and rear wall 76 of lift column 22. Lift column 22 preferably has one or more support gussets 84 welded to the bottom thereof for supporting lift column 22 upon its base plate 86.

Referring to FIGS. 3-6, lift 20 also is seen to include hydraulic lifting means 88 for moving carriage 26 vertically with respect to lift column 22, with hydraulic lifting means 88 comprising first and second hydraulic cylinders 90 and 92, respectively, "piggy-backed" together as shown. It will be understood that lift column 24 includes a similar hydraulic lifting means to hydraulic lifting means 88, and the following description of hydraulic lifting means 88 will suffice for both. Hydraulic cylinders 90 and 92 are each preferably of the single stage variety, as contrasted with multi-stage telescoping hydraulic cylinders well-known to those skilled in the art.

As shown in FIG. 6, each of hydraulic cylinders 90 and 92 includes a cylinder body or casing, 94 and 96, respectively, each said cylinder body respectively having a longitudinal bore, 98 and 100, therethrough. Each of hydraulic cylinders 90 and 92 further includes a piston rod, 102 and 104, respectively, mounted for reciprocating movement within its respective longitudinal bore, 98 or 100. Each piston rod 102 and 104 has a first end, 106 and 108, respectively, within the respective longitudinal bore, and has a second end, 110 and 112, respectively, extending outwardly of the respective cylinder body, 94 and 96.

As shown in FIGS. 3-6, first and second hydraulic cylinder bodies 94 and 96 are secured from longitudinal motion with respect to each other, preferably as by welding cylinder bodies 94 and 96 together, with piston rods 102 and 104 of first and second hydraulic cylinders, 90 and 92, respectively, extending outwardly in opposite directions, preferably with piston rod 102 extending upwardly as shown and with piston rod 104 extending downwardly.

First ends 106 and 108 of piston rods 102 and 104 each preferably have a well-known piston, 114 and 116, respectively, attached thereto and slidably sealed to the walls of respective bores 98 and 100 by well-known seals 118 and 120, as well as well-known wear bands 122 and 124, respectively resting as shown in circumferential grooves about pistons 114 and 116, in a manner well-known to those skilled in the art.

Additionally, the open ends, 126 and 128 respectively, of cylinder bodies 94 and 96 through which piston rods 102 and 104 respectively pass are slidably sealed to piston rods 102 and 104 by well-known piston rod seals, 130 and 132, respectively, as well as well-known piston rod wipers, 134 and 136, respectively, resting as shown in interior grooves within cylinder plugs 138 and 140, respectively, all well-known to those skilled in the art.

Second end 110 of piston rod 102 is attached to carriage 26 for joint movement therewith as by having a threaded extension 142 of end 110 being secured through a hole 144 in the top 74 of carriage 26 by nut 146. Piston rod 102 is preferably hollow, as shown, having a bore 148 therethrough that is open at first end 106 to which piston 114 is attached, and which is sealed at second end 110, which passes through open end 126 of cylinder body 94, by a bleeder screw 150 hereinafter described, which is threadedly screwed into bore 148 at second end 110.

Second end 112 of piston rod 104 is secured from movement with respect to lift column 22, preferably by a pin 152 extending longitudinally therefrom that is inserted into a hole 154 within base plate 86. Such an attachment of piston rod 104 to base 86 also ensures the proper alignment of cylinder 92 within lift column 22. It shall be understood that the weight of carriage 26 bearing down upon hydraulic lifting means 88 keeps pin 152 within hole 154. Piston rod 104 is hollow, as shown, having a bore 156 therethrough that is open at first end 108 to which piston 116 is attached, and which is sealed at second end 112. A hydraulic fitting 158, well-known to those skilled in the art, is screwingly inserted into second end 112, thereby placing a hydraulic supply line 160 in communication with bore 156 in a manner that will now be understood. A well-known bleeder screw 162 is preferably provided in the sealed end 164 of cylinder body 96.

Figure 3:
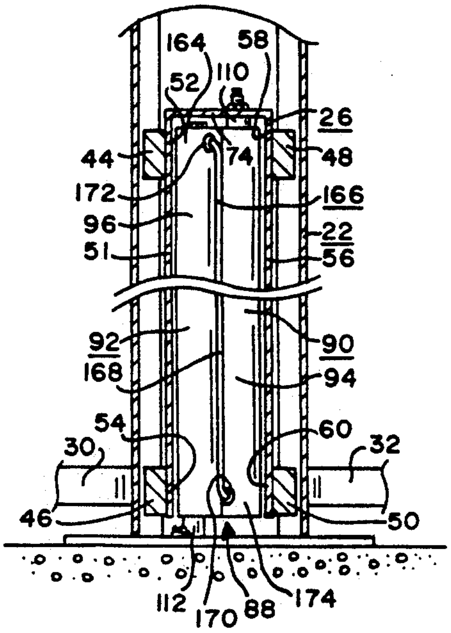
FIG. 3 is a sectional View of one lift column of the present invention showing the internal details thereof, taken substantially along the line 3—3 shown in FIG. 2, with the carriage lowered.
Figure 4:
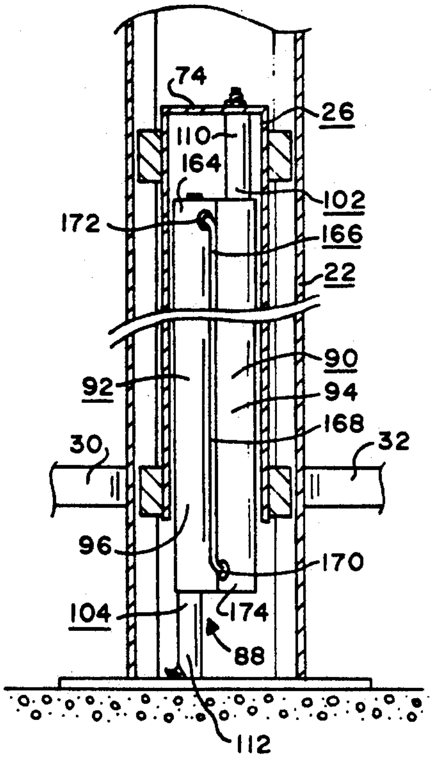
FIG. 4 is a sectional view of the same lift column shown in FIG. 3, but with the carriage raised somewhat.

Referring to FIGS. 3, 4, and 6, hydraulic lifting means 88 additionally comprises interconnection means 166 for passing hydraulic fluid between longitudinal bores 98 and 100 of first and second hydraulic cylinders 90 and 92, respectively, and for equalizing the hydraulic pressure therebetween. In the preferred embodiment, interconnection means 166 comprises a hydraulic tube 168 between hydraulic fittings 170 and 172 respectively into bores 98 and 100 adjacent the sealed ends 174 and 164, respectively, thereby allowing hydraulic fluid to pass from hydraulic supply line 160, up through bore 156 through piston rod 104 into the region 176 of bore 100 adjacent sealed end 164 of cylinder body 96, then through fitting 172, tube 168, and fitting 170 into region 178 of bore 98 adjacent sealed end 174 of cylinder body 94. It will now be understood by those skilled in the art that interconnection means 166 provides for equalizing the hydraulic pressure between first and second hydraulic cylinders 90 and 92 by placing regions 176 and 178 in communication with each other. Additionally, because bores 98 and 100 within first and second hydraulic cylinders 90 and 92 are preferably of substantially the same diameter, piston rods 102 and 104 will be understood to consequently extend and retract at the same rate because of the equalized pressure between the two hydraulic cylinders 90 and 92. Furthermore, because of the hollow bore 148 through piston rod 102, both first and second hydraulic cylinders 90 and 92 can be bled of air by opening bleeder screw 150 and forcing hydraulic fluid through supply line 160 into cylinder 92, in a manner now understood by those skilled in the art.

Figure 7:
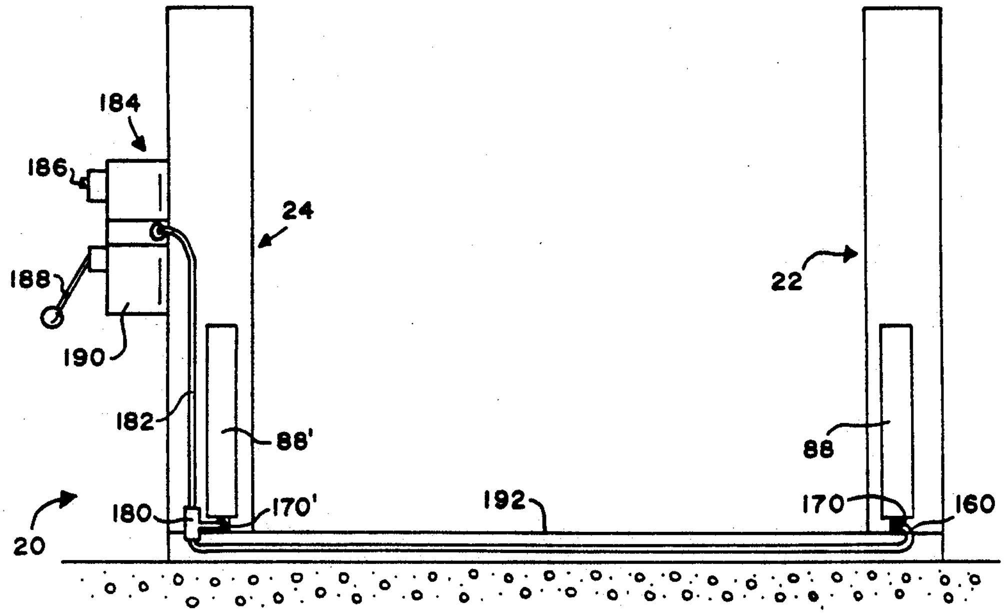
FIG. 7 is a hydraulic schematic diagram of the present invention showing the interconnections of the hydraulic circuit with the lift cylinders.

Referring to FIG. 7, the hydraulic lifting means 88 of first lift column 22 is preferably interconnected to the hydraulic lifting means 88, of second lift column 24 through hydraulic supply line 160 from hydraulic fitting 170 to a well-known hydraulic tee 180 at similar hydraulic fitting 170' into hydraulic lifting means 88', with tee 180 being further connected through hydraulic supply line 182 to well-known hydraulic control means 184 interposed between a source of hydraulic power, not shown, and lifting means 88 and 88' Hydraulic control means 184 may have well-known buttons such as button 186 and levers such as lever 188, as well as a reservoir 190 interconnected and operable in a manner well-known to those skilled in the art. Additionally, a cover plate 192 preferably extends between lift columns 22 and 24 for covering hydraulic supply line 160 therebetween.

Figure 8:
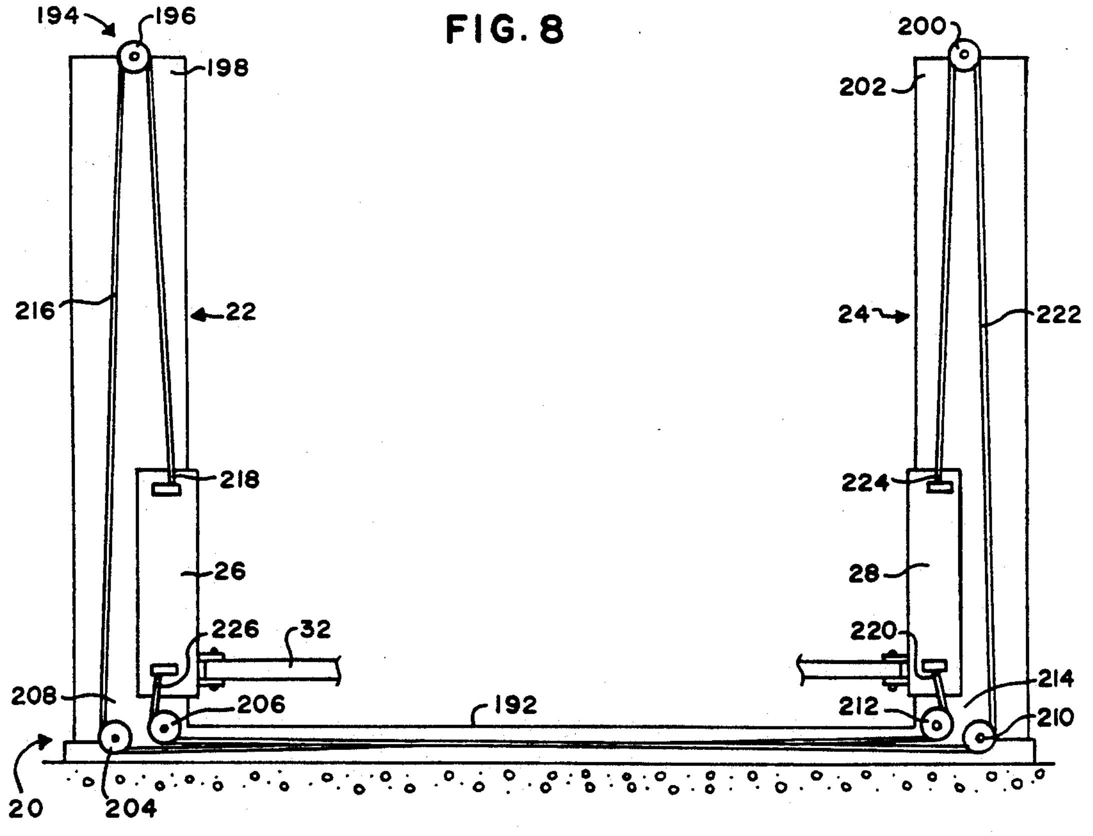
FIG. 8 is a somewhat diagrammatic view of the present invention showing the cable equalization means interconnecting with the two lift columns.

Referring to FIG. 8, lift 20 additionally preferably comprises cable equalization means 194 for ensuring that first carriage 26 is at substantially the same vertical height as second carriage 28 as both move vertically on their respective lift columns, 22 and 24. Cable equalization means 194 preferably includes a first sheave or pulley 196 mounted on a top portion 198 of first lift column 22, a second sheave or pulley 200 mounted on a top portion 202 of second lift column 24, third and fourth sheaves or pulleys 204 and 206, respectively, each mounted on a bottom portion 208 of first lift column 22, and fifth and sixth sheaves or pulleys 210 and 212, respectively, each mounted on a bottom portion 214 of second lift column 24. Additionally, cable equalization means 94 preferably includes a first cable 216 having a first end 218 and a second end 220, with first end 218 being attached to first carriage 26 and with second end 220 being attached to second carriage 28 in a manner well-known to those skilled in the art. First cable 216 extends from first end 218, passes around first pulley 196, then around third pulley 204, then around sixth pulley 212, to second end 220.

Cable equalization means 194 similarly preferably includes a second cable 222 having a first end 224 and a second end 226, with first end 224 being attached to second carriage 28 and with second end 226 being attached to first carriage 26 in a manner well-known to those skilled in the art. Second cable 222 extends from first end 224, passes around second pulley 200, then around fifth pulley 210, then around fourth pulley 206, to second end 226. As with hydraulic supply line 160, first and second cables 216 and 222 pass between lift columns 22 and 24 under cover plate 192 for safety.

An examination of the cable topology described and shown in FIG. 8 reveals that carriages 26 and 28 are now constrained to rise and fall together, maintaining substantially the same vertical height with respect to each other.

The preceding description of the preferred embodiment of lift 20 having now been given, the operation thereof can now be explained. Referring to FIGS. 3 and 4, it will be understood that, when piston rods 102 and 104 are fully extended and carriage 26 is fully raised, approximately one-third of the lifting height will be supplied by each of piston rods 102 and 104, with the remaining one-third being supplied by the length of cylinder bodies 94 and 96. Furthermore, when lowered as shown in FIG. 3, the top 74 of carriage 26 need only be approximately the length of cylinder bodies 94 or 96, i.e., approximately one-third the lifting height, above the ground, because of the way carriage 26 surrounds lifting means 88. Because of this, it will now be understood that the top 74 of carriage 26 will extend only approximately one-third the lifting height above the bottom of the vehicle being lifted when carriage 26 is fully raised. This is a substantially shorter distance than the one-half lifting height that a single hydraulic lift cylinder design, such as those heretofore known, requires, thereby allowing lifts of the present invention to be used in areas with reduced ceiling clearance.

As hydraulic fluid is forced into lifting means 88 through supply line 160, piston rods 102 and 104 will extend and carriage 26 will raise. As hydraulic fluid is allowed to flow out of lifting means 88 through supply line 160, carriage 26 will lower under the forces of gravity.

It will be understood, of course, that carriage 28 of lift column 24 operates in a similar manner.

Although the present invention has been described and illustrated with respect to a preferred embodiment and a preferred use therefor, it is not to be so limited since modifications and changes can be made therein which are within the full intended scope of the invention.

We claim:

1. A vehicle lift for raising and lowering a vehicle, said lift comprising:
   (a) a lift column;
   (b) a carriage mounted on said lift column for vertical movement with respect thereto; and
   (c) hydraulic lifting means for moving said carriage vertically with respect to said lift column, said hydraulic lifting means comprising a first and a second hydraulic cylinder, each said hydraulic cylinder comprising:
      i. a cylinder body having a longitudinal bore thereinto; and
      ii. a piston rod mounted for reciprocating movement within said longitudinal bore, said piston rod having a first end within said longitudinal bore and having a second end extending outwardly of said cylinder body;

said first and said second hydraulic cylinder bodies being secured from longitudinal motion with respect to each other with said second ends of said piston rods of said first and said second hydraulic cylinders extending outwardly in opposite directions, said second end of said piston rod of said first hydraulic cylinder being attached to said carriage for joint movement therewith and said second end of said piston rod of said second hydraulic cylinder being secured from movement with respect to said lift column 2. The vehicle lift as recited in claim 1, in which said hydraulic lifting means additionally comprises interconnection means for passing hydraulic fluid between the longitudinal bores of said first and said second hydraulic cylinders and for equalizing the hydraulic pressure therebetween.

3. The vehicle lift as recited in claim 1, in which said lift column comprises a base plate secured to the bottom thereof, said base plate having a hole therein, and in which said second end of said piston rod of said second hydraulic cylinder includes a pin extending longitudinally therefrom, said pin being inserted within said hole in said base plate.

4. A vehicle lift for raising and lowering a vehicle, said lift comprising:

(a) a first and a second lift column;

(b) a first and a second carriage respectively mounted on said first and said second lift columns for vertical movement with respect thereto; and (c) first and second hydraulic lifting means for respectively moving said first and said second carriages vertically with respect to their respective said first and second lift columns, each said hydraulic lifting means comprising a first and a second hydraulic cylinder, each said hydraulic cylinder comprising:

i. a cylinder body having a longitudinal bore thereinto; and ii. a piston rod mounted for reciprocating movement within said longitudinal bore, said piston rod having a first end within said longitudinal bore and having a second end extending outwardly of said cylinder body;

said first and said second hydraulic cylinder bodies of each said hydraulic lifting means being secured from longitudinal motion with respect to each other with said second ends of said piston rods of said first and said second hydraulic cylinders of each said hydraulic lifting means extending outwardly in opposite directions, said second end of said piston rod of said first hydraulic cylinder of said first hydraulic lifting means being attached to said first carriage for joint movement therewith, said second end of said piston rod of said second hydraulic cylinder of said first hydraulic lifting means being secured from movement with respect to said first lift column, said second end of said piston rod of said first hydraulic cylinder of said second hydraulic lifting means being attached to said second carriage for joint movement therewith, and said second end of said piston rod of said second hydraulic cylinder of said second hydraulic lifting means being secured from movement with respect to said second lift column.

5. The vehicle lift as recited in claim 4, in which each said hydraulic lifting means additionally comprises interconnection means for passing hydraulic fluid between the longitudinal bores of its said first and said second hydraulic cylinders and for equalizing the hydraulic pressure therebetween.

6. The vehicle lift as recited in claim 4, in which each said lift column comprises a base plate secured to the bottom thereof, each said base plate having a hole therein, and in which said second end of said piston rod of each said second hydraulic cylinder includes a pin extending longitudinally therefrom, said pin of said second hydraulic cylinder of said first hydraulic lifting means being inserted within said hole in said base plate of said first lift column, and said pin of said second hydraulic cylinder of said second hydraulic lifting means being inserted within said hole in said base plate of said second lift column.

7. The vehicle lift as recited in claim 4, in which said lift additionally comprises cable equalization means for ensuring that said first carriage is at substantially the same vertical height as said second carriage as both move vertically on their respective lift columns.

8. The vehicle lift as recited in claim 7, in which said cable equalization means comprises:

(a) a first pulley mounted on a top portion of said first lift column;

(b) a second pulley mounted on a top portion of said second lift column;

(c) a third pulley and a fourth pulley, each mounted on a bottom portion of said first lift column;

(d) a fifth pulley and a sixth pulley, each mounted on a bottom portion of said second lift column;

(e) a first cable having a first end and a second end, said first end of said first cable being attached to said first carriage and said second end of said first cable being attached to said second carriage, said first cable extending from said first end thereof, passing around said first pulley, then around said third pulley, then around said sixth pulley, to said second end of said first cable; and (f) a second cable having a first end and a second end, said first end of said second cable being attached to said second carriage and said second end o said second cable being attached to said first carriage, said second cable extending from said first end thereof, passing around said second pulley, then around said fifth pulley, then around said fourth pulley, to said second end of said second cable.

9. A vehicle lift for raising and lowering a vehicle, said lift comprising:

(a) a first and a second lift column, each said lift column including a base plate secured to the bottom thereof, each said base plate having a hole therein;

(b) a first and a second carriage respectively mounted on said first and said second lift columns for vertical movement with respect thereto;

(c) first and second hydraulic lifting means for respectively moving said first and said second carriages vertically with respect to their respective said first and second lift columns, each said hydraulic lifting means comprising a first and a second hydraulic cylinder, each said hydraulic cylinder comprising:

i. a cylinder body having a longitudinal bore thereinto; and ii. a piston rod mounted for reciprocating movement within said longitudinal bore, said piston rod having a first end within said longitudinal bore and having a second end extending outwardly of said cylinder body, said second end including a pin extending longitudinally therefrom;

each said hydraulic lifting means additionally comprising interconnection means for passing hydraulic fluid between the longitudinal bores of its said first and said second hydraulic cylinders and for equalizing the hydraulic pressure therebetween; said cylinder bodies of said first and said second hydraulic cylinders of each said hydraulic lifting means being fixedly attached together such that said second ends of said piston rods of said first and said second hydraulic cylinders of each said hydraulic lifting means extend outwardly in opposite directions, said second end of said piston rod of said first hydraulic cylinder of said first hydraulic lifting means being attached to said first carriage for joint movement therewith, said pin of said second end of said piston rod of said second hydraulic cylinder of said first hydraulic lifting means being inserted within said hole in said base of said first lift column, said second end of said piston rod of said first hydraulic cylinder of said second hydraulic lifting means being attached to said second carriage for joint movement therewith, and said pin of said second end of said piston rod of said second hydraulic cylinder of said second hydraulic lifting means being inserted within said hole in said base of said second lift column; and (d) cable equalization means for ensuring that said first carriage is at substantially the same vertical height as said second carriage as both move vertically on their respective lift columns.

10. The vehicle lift as recited in claim 9, in which said cable equalization means comprises:

(a) a first pulley mounted on a top portion of said first lift column;

(b) a second pulley mounted on a top portion of said second lift column;

(c) a third pulley and a fourth pulley, each mounted on a bottom portion of said first lift column;

(d) a fifth pulley and a sixth pulley, each mounted on a bottom portion of said second lift column;

(e) a first cable having a first end and a second end, said first end of said first cable being attached to said first carriage and said second end of said first cable being attached to said second carriage, said first cable extending from said first end thereof, passing around said first pulley, then around said third pulley, then around said sixth pulley, to said second end of said first cable; and (f) a second cable having a first end and a second end, said first end of said second cable being attached to said second carriage and said second end of said second cable being attached to said first carriage, said second cable extending from said first end thereof, passing around said second pulley, then around said fifth pulley, then around said fourth pulley, to said second end of said second cable.

* * * * *